United States Patent [19]
Bishop et al.

[11] Patent Number: 5,936,752
[45] Date of Patent: Aug. 10, 1999

[54] WDM SOURCE FOR ACCESS APPLICATIONS

[75] Inventors: David J. Bishop, Summit; Joseph E. Ford, Oakhurst; James A. Walker, Howell, all of N.J.

[73] Assignee: Lucent Technologies, Inc., Murray Hill, N.J.

[21] Appl. No.: 08/778,120

[22] Filed: Jan. 2, 1997

Related U.S. Application Data

[60] Provisional application No. 60/018,417, May 28, 1996.

[51] Int. Cl.⁶ ........................................... H04J 14/02
[52] U.S. Cl. .......................... 359/124; 359/130; 359/290
[58] Field of Search ................................... 359/124, 130, 359/290, 291; 385/52

[56] References Cited

U.S. PATENT DOCUMENTS

| | | | |
|---|---|---|---|
| 5,450,510 | 9/1995 | Boord et al. ........................ | 359/130 X |
| 5,500,761 | 3/1996 | Goossen et al. ........................ | 359/290 |
| 5,526,155 | 6/1996 | Knox et al. ............................ | 359/130 |
| 5,745,271 | 4/1998 | Ford et al. ............................. | 359/130 |

*Primary Examiner*—Thomas Mullen

[57] ABSTRACT

The present invention provides an apparatus and method for a single-source wavelength division multiplexed (WDM) signal. According to the invention, light from a broad wavelength bandwidth or multiwavelength source is delivered, over one or more input optical fibers, to a device for spatially separating the light into a plurality of spectral components each having a different wavelength. The device further directs the spectral components along separate optical paths. A modulator array is provided containing a plurality of optical modulators spaced to each receive one of the different spectral components. Information is encoded on each spectral component through the action of each modulator. The encoded spectral components originating from a given input fiber are combined to generate a multiplexed optical signal.

21 Claims, 6 Drawing Sheets

WDM SOURCE FOR ACCESS APPLICATIONS

STATEMENT OF RELATED CASES

This is a Provisional Application Ser. No. 60/018,417 filed May 28, 1996 and U.S. Pat. No. 5,745,271 issued Apr. 28, 1998.

FIELD OF THE INVENTION

The present application relates to optical communications using wavelength division multiplexing. More particularly, the invention relates an improved source for a wavelength division multiplexed-based optical communications system.

BACKGROUND OF THE INVENTION

Wavelength division multiplexed (WDM) optical fiber communications systems transmit data on several optical carrier signals having different wavelengths. Typical prior art WDM systems use a separate optical signal source for generating each carrier signal. For example, a 1×N array of laser diode signal sources may be used to provide N carrier signals having different wavelengths. The carrier signal wavelengths are typically evenly spaced apart within the bandwidth of the optical fiber in which the signals are transmitted. Each laser diode is modulated by a different data stream so that N independent channels of information are provided.

There are a number of drawbacks associated with such multi-source systems. For example, each optical source typically requires active wavelength stabilization in order to prevent cross-talk or overlap between adjacent channel signals. Additional hardware and processing may be required for such stabilization. Furthermore, the complexity of individually-stabilized laser diode sources currently limits practical laser diode arrays to about 10 to 20 diodes. Additionally, the most efficient currently available photonic integrated circuits can be formed with only about four laser sources on a single chip. Packaging and source complexity constraints therefore represent a significant problem in present multi-source WDM applications. The complexity of each source also substantially increases the overall optical system cost. Although a large number of sources may permit large numbers of channels in principle, the aforementioned practical considerations presently limit the channel density of WDM systems to about 20 channels.

As such, a need exists for a single-source WDM system that avoids the cost, complexity and stabilization problems of the prior art.

SUMMARY OF THE INVENTION

The present invention provides an apparatus and method for a single-source wavelength division multiplexed (WDM) signal. According to the invention, light from a broad wavelength bandwidth or multiple wavelength source is delivered, over one or more input optical fibers, to a device for spatially resolving the light delivered by each input fiber into a plurality of spectral components each having a different wavelength. The device further directs the spectral components along separate optical paths. A modulator array is provided containing a plurality of optical modulators spaced to receive one of the different spectral components.

Information is encoded on each spectral component through the action of each modulator. In preferred embodiments, the encoded spectral components are then directed to a device that combines all the spectral components originating from a given input fiber. In this manner, a multiplexed optical signal is generated from a single light source.

BRIEF DESCRIPTION OF THE DRAWINGS

The aforementioned and other features of the invention will become more apparent, and a better understanding of the present invention gained, from the following detailed description of specific embodiments thereof when read in conjunction with the accompanying drawings, in which.

DETAILED DESCRIPTION OF THE INVENTION

Figure 1:
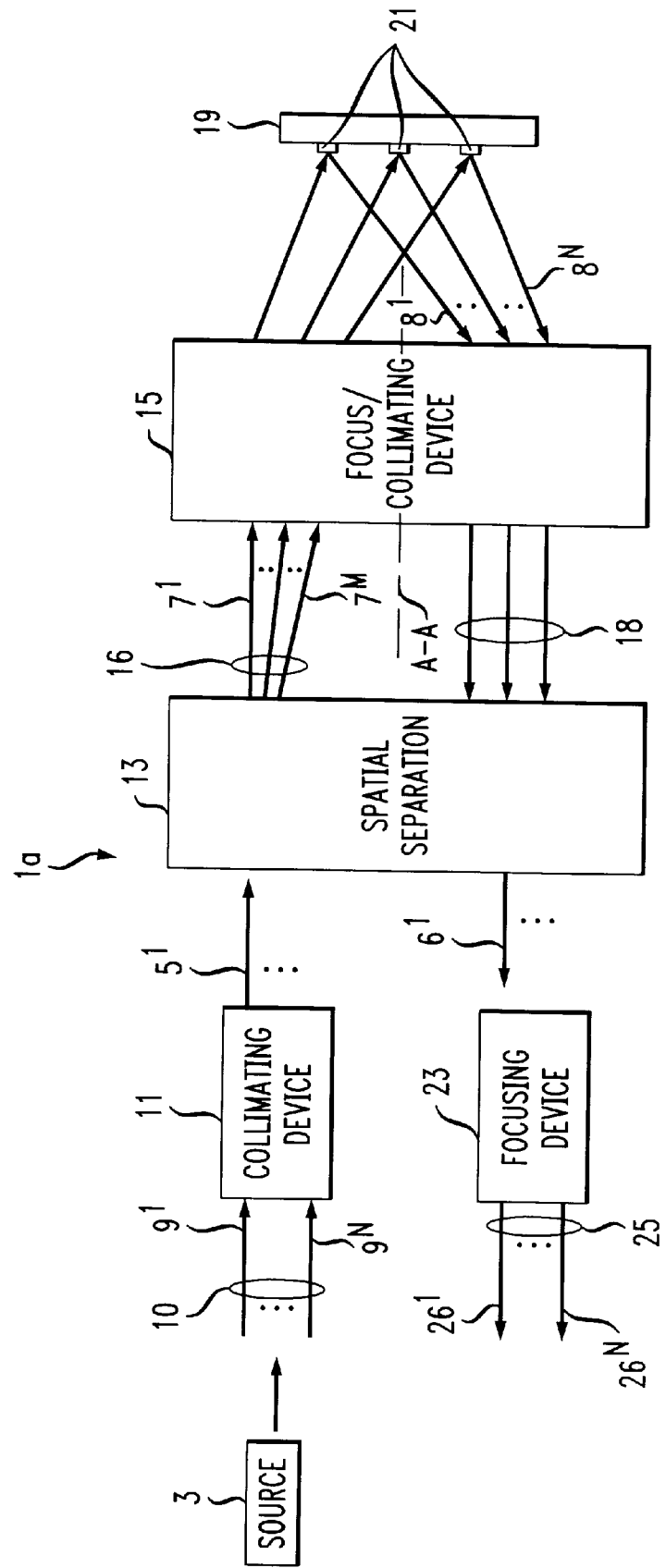
FIG. 1 is a schematic view of a first illustrative embodiment of a single-source WDM transmitter according to the present invention.

A first exemplary single-source WDM transmitter $1a$ according to the present invention is illustrated in FIG. 1. A broad wavelength bandwidth or multiwavelength light source 3 capable of producing light having a broad range of spectral components, i.e., wavelengths, provides one or more optical signals to the transmitter $1a$. Suitable exemplary light sources include, without limitation, a multi-frequency laser operated either pulsed or continuous wave and without data modulation, a broad spectrum light emitting diode, and an arc lamp appropriately filtered and amplified.

Light from the source 3 is received by each fiber $9^i$ of a one-dimensional (1-D) array 10 of N input optical fibers 9. Each of the N input fibers 9 thus supports transmission of an optical signal $5^i$ comprising a plurality of spectral components $7^{1-M}$.

In the first exemplary embodiment of the WDM transmitter $1a$, a collimating device 11, such as a lens or a curved mirror, is in optical communication with the array 10 of input optical fibers. Each input optical fiber $9^i$ is brought to a flush termination, wherein the optical signal $5^i$ carried by the fiber $9^i$ is emitted toward the first collimating device 11. The collimating device 11 focuses all the spectral components $7^{1-M}$ emitted by each input fiber $9^i$ at substantially infinite conjugates, thereby substantially collimating all the spectral components of each optical signal $5^i$.

A device 13 for spatially separating each spectral component $7^i$ from every other spectral component of each signal $5^i$ is in optical communication with the collimating device 11. In an exemplary embodiment, the device 13 is a blazed diffraction grating. The collimated optical signals exiting the collimating device 11 impinge upon the diffraction grating causing each spectral component $7^i$ to disperse at an angle approximately proportional to its wavelength. For simplicity, the diffraction of a single optical signal $5^1$ is illustrated in FIG. 1. The various spectral components received by the device 13 are directed toward a focusing/collimating device 15, which can be a single lens or a curved mirror. The device 15 is configured so that it receives all the spectral components $7^{1-M}$ of each optical signal $5^{1-N}$ along a first path 16 that is off center with respect to its optical axis A—A. As described later, the off-center first path enables the various spectral components to be reflected back through the focusing/collimating device 15 along a second path 18 so as to be received by a 1D array 25 of N output optical fibers 26.

The focusing/collimating device 15 focuses the various spectral components $7^{1-M}$ at different locations on a two-dimensional (2D) modulator array 19. For simplicity, FIG. 1 shows the array 19 to be a 1D array receiving the spectral components of a single optical signal $5^1$. The second dimension of the array 19 is "out of the page," with additional columns of modulators 21 receiving the spectral components from other input optical signals $5^2$–$5^N$. The 2D modulator array 19 preferably contains N×M surface-normal micromechanical optical modulators 21, where M is the number of independent wavelength channels.

The operating wavelength and speed of the modulators 21 are suitably selected as a function of the intended service. The modulators can operate in the visible range, or 850 nanometers (nm) or telecommunication wavelengths and can transmit data at about 1 million bits per second or more.

Exemplary suitable optical modulators include micromechanical modulators such as, without limitation, those described in U.S. Pat. No. 5,500,761, and U.S. Pat. Nos. 5,636,052; 5,654,819; 5,589,974; 5,825,528; 5,751,469 and 5,659,418. Such modulators include a movable membrane suspended above a substrate, defining a gap therebetween. The movable membrane comprises at least one layer of material having a refractive index that is approximately equal to the refractive index of the substrate. As a voltage is applied by a controlled voltage source, the movable membrane moves toward the substrate, changing the size of the gap. As the gap size changes, modulator reflectivity changes. The change in reflectivity can be used to modulate an optical signal. In other embodiments, other types of micromechanical modulators or semi-conductor optical modulators can be used. The aforementioned patent and patent applications, as well as any other patents, patent applications and publications mentioned in this specification are incorporated by reference herein.

The modulators 21 in the modulator array 19 have a pitch spacing selected so that each spectral component $7^i$ of light reflected by the device 13 is focused on a different modulator 21 within the N×M modulator array 19 by the focusing/collimating device 15. Information can then be encoded on each of M spectral components $7^i$ by the action of a modulator 21.

Modulated spectral components $8^{1-M}$ for each of the N optical signals are directed to the focusing/collimating device 15 and follow the second path 18 off-center with respect to the device's optical axis A—A. The focusing/collimating device 15 directs the modulated spectral components $8^{1-M}$ to the device 13, at substantially the same angle at which the spectral components $7^{1-M}$ left the device 13. Consequently, the various modulated spectral components corresponding to each original optical signal are multiplexed into modulated optical signals $6^{1-N}$ by the device 13. FIG. 1 illustrates the multiplexing of the spectral components $8^{1-M}$ into modulated WDM signal $6^1$. Note that when the focusing/collimating device 15 receives the spectral components $7^{1-M}$, it focuses them on the modulator array. When it receives the spectral components $8^{1-M}$, however, it collimates them.

A focusing device 23, such as a lens or curved mirror, is in optical communication with the device 13 and a 1D array 25 of N output optical fibers 26. The device 13 directs collimated modulated multiplexed optical signals $6^{1-N}$ to the focusing device 23, which focuses the spectral components $8^{1-M}$ of each of the N modulated signals 6 onto the 1D array 25 of N output optical fibers 26. In this manner, a plurality of modulated multiplexed data signals are generated from a single broad band or multiwavelength optical source and coupled into an array of output fibers.

In the first exemplary embodiment of a transmitter 1a according to the present invention, an off-center optical configuration is used so that the modulated multiplexed signals $6^{1-N}$ are delivered to an array 25 of output fibers distinct from the array 10 of input fibers. In an alternative embodiment, a single array of optical fibers could be used for input and output. In such a case, an off-center optical configuration within the transmitter is not required. Rather, an external fiber component, such as a 2×2 splitter or an optical circulator, is used to separate the modulated output signals 6 from the input.

Figure 2:
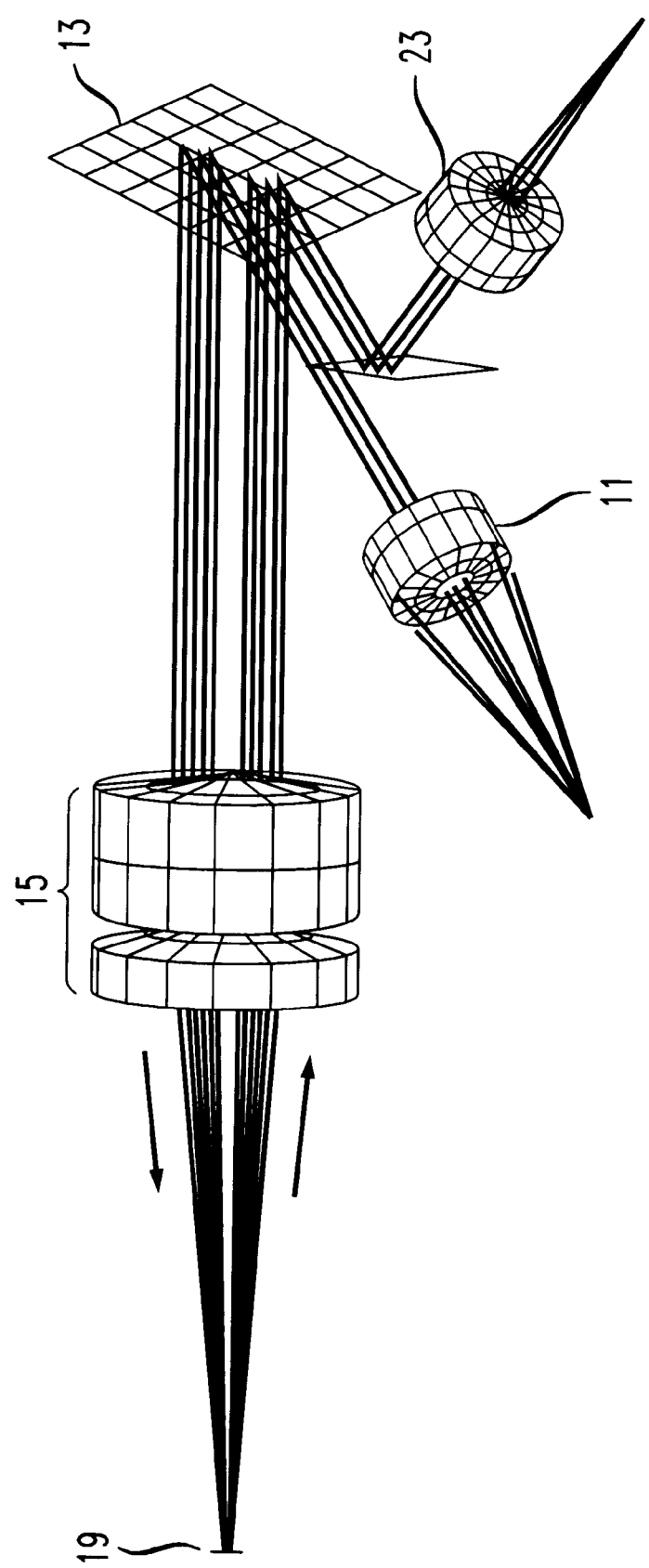
FIG. 2 illustrates the orientation of lenses and a grating used in an exemplary embodiment of the present invention.

It was noted above that the device 13 for spatially separating the spectral components of an optical signal may be, in one embodiment, a blazed diffraction grating. In presently preferred embodiments, if such a diffraction grating is used, it is oriented in a "skew"—Littrow mount as shown in FIG. 2.

A Littrow mount is a standard configuration in spectrometer design. See Born et al., *Principles of Optics*, Chap. 8, Sect. 6 (6th Ed., Pergammon Press 1984). In Littrow configuration, the grating is placed so that diffracted light is approximately retroreflected back towards the original source, except that each color returns at a slightly different angle. For compactness, a single lens can be used to collimate incident light, and focus the diffracted output. Littrow configuration offers certain advantages in optical performance, including a relatively low sensitivity to input polarization.

To spatially separate the diffracted light from the original source, it is necessary to tilt the grating slightly away from perfect or "true" Littrow configuration. In spectrometers, where the optical paths and the lens focal lengths are large, a slight tilt angle is often sufficient. Therefore, the optical performance is not significantly affected. In preferred implementations of the present invention, it is necessary to keep the lens focal length short, hence the tilt angle necessary to separate the diffracted output can be as large as 45°. In prior art applications in which a short focal length is required, the tilt is applied in the same plane as the spread of diffracted wavelengths. Such an approach is the simplest, since the optical system remains on a two-dimensional surface, making it relatively easy to fabricate mounts and align the optics. In other words, a constant beam height about the mount plane is retained.

According to the present invention, the grating 13 is tilted in the orthogonal direction, so that the beams are shifted out of the plane of diffracted light. Such a configuration is shown in FIG. 2. Such a configuration requires a three dimensional layout, and causes the light rays to follow a "skewed" optical path through the focusing/collimating device 15. While historically it would have been difficult to design such a skewed optical system, such designs are now readily handled by computer lens design programs known to those skilled in the art.

The principle advantage of the present configuration is that the deviation from Littrow configuration is made in the orthogonal plane from the plane of diffraction. This allows a large angle of separation of the diffracted output from the input light without sacrificing the beneficial polarization properties of the Littrow configuration.

Figure 3:
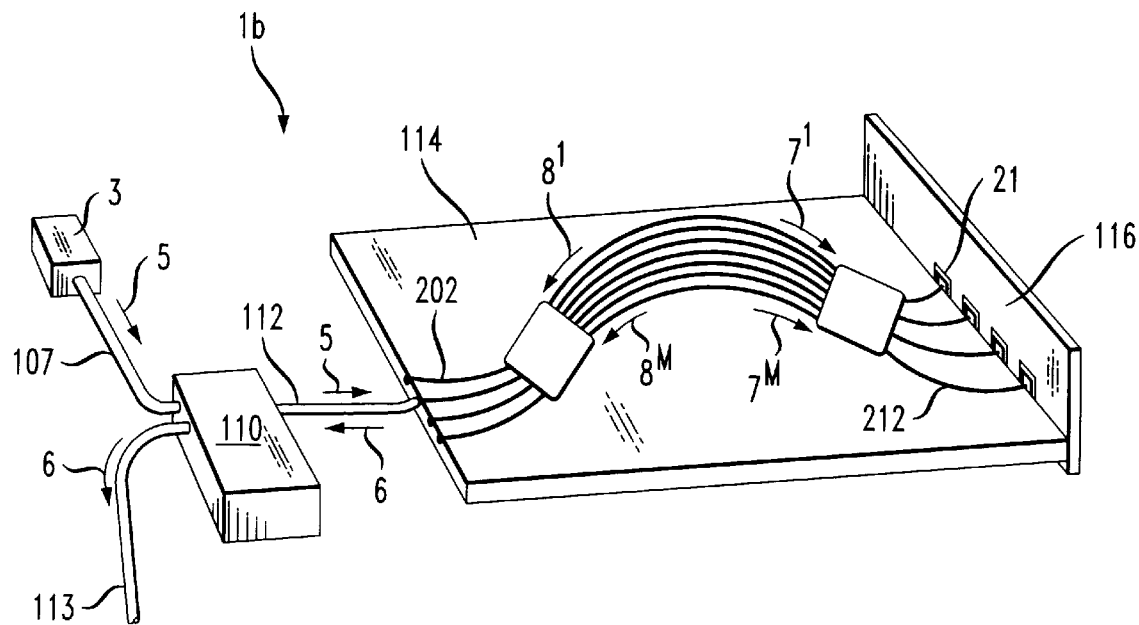
FIG. 3 is a schematic view of a second illustrative embodiment of a single-source WDM transmitter according to the present invention.

The exemplary embodiment of a WDM transmitter 1a described above utilizes free-space optics. In a second exemplary embodiment, a WDM transmitter 1b according to the present invention can be implemented advantageously using integrated optics, as shown in FIG. 3. The various collimating and focusing devices used in conjunction with the transmitter 1a are not required when using such integrated optics.

The WDM transmitter 1b includes a routing device 110, such as an optical circulator or a 50/50 splitter. The routing device 110 receives an optical signal 5 from a broad band optical source 3 to which it is optically coupled, such as by a fiber 107 shown in FIG. 3. Suitable optical sources include those previously described. The routing device 110 delivers the optical signal 5 to an optical fiber 112, which is brought to a flush termination at a device 114 for spatially separating each spectral component $7^i$ from other spectral components of the optical signal 5. In a transmitter using integrated optics, such as the transmitter 1b, the device 114 is an arrayed waveguide such as a Dragone router (also known as a waveguide array router). See Dragone, "An N×N Optical Multiplexer Using a Planar Arrangement of Two Star Couplers," IEEE Photon. Tech. Lett., 3(9), pp. 812–815 (September 1991); Zirngibl, et al., "Demonstration of a 15×15 Arrayed Waveguide Multiplexer on InP," IEEE Phot. Tech. Lett., 4(11), pp. 1250–1253 (November 1992).

Figure 4:
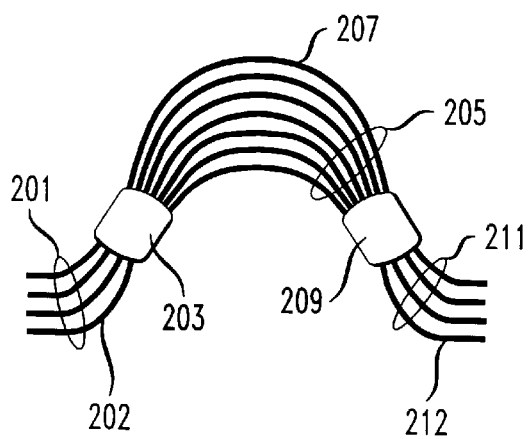
FIG. 4 is a schematic view of a Dragone router.

The Dragone router, shown in FIG. 4, consists of an input array 201 of waveguides 202 connected to a first planar free space region 203, an output array 211 of waveguides 212 connected to a second planar free space region 209, and a waveguide grating 205 connecting the first and the second free space region. The waveguide grating 205 consists of a plurality of unequal length waveguides or grating arms 207.

Typically, the input array 201 contains the same number of waveguides as the output array 211, which is usually in the range of from about 4 to 16 waveguides. There is a one-to-one correspondence between the number of waveguides 212 in the output array 211 and the number of spectral components in the optical signal being demultiplexed. Only one of the waveguides 202 in the input array 201 is active, i.e., the optical fiber 112 is connected to only one of such waveguides. In other words, the Dragone router processes a single multi-wavelength input signal 5 at a time.

With continuing reference to FIG. 3, the optical signal 5 delivered from the one active waveguide 202 expands in the first planar free space region 203 and couples to the grating arms. A constant path length difference between adjacent gratings causes a wavelength dependent phase shift. This linear phase progression affects the propagation direction of the converging wave radiated in the second free space region 209 towards the output array 211. Consequently, various spectral components $7^{1-M}$ having differing wavelengths couple to different waveguides 212 in the output array 211.

A 1-D array 116 of modulators 21 is attached to the arrayed waveguide 114. Each modulator 21 in the array 116 is optically aligned with one of the waveguides 212. Information can then be encoded on the spectral component $7^i$ delivered to a particular modulator 21 by the action of the modulator.

A modulated spectral component $8^i$ is returned from each modulator 21. Modulated spectral components $8^{1-M}$ travel back through the second planar free space region 209, the waveguide grating 205 and the first planar free space region 203 and are multiplexed forming a modulated optical signal $6^i$ travelling back through the optical fiber 112. The modulated optical signal is separated into a distinct output fiber 113 by a second pass through the routing device 110.

It should be appreciated that while the transmitter 1a can deliver a plurality of modulated WDM signals, the transmitter 1b can deliver only a single modulated WDM signal at a time.

In the exemplary embodiments of the transmitters 1a and 1b described above, the modulators 21 operate in a reflective mode, wherein the modulated spectral components are reflected away from the modulators. In alternate embodiments, the reflective modulators 21 can be replaced with transmissive modulators 22. Transmissive modulators vary the amount of signal passed through the modulator. A preferred design for a transmissive modulator is disclosed in U.S. patent application Ser. No. 08/775,910 filed Jan. 2, 1997.

Figure 5:
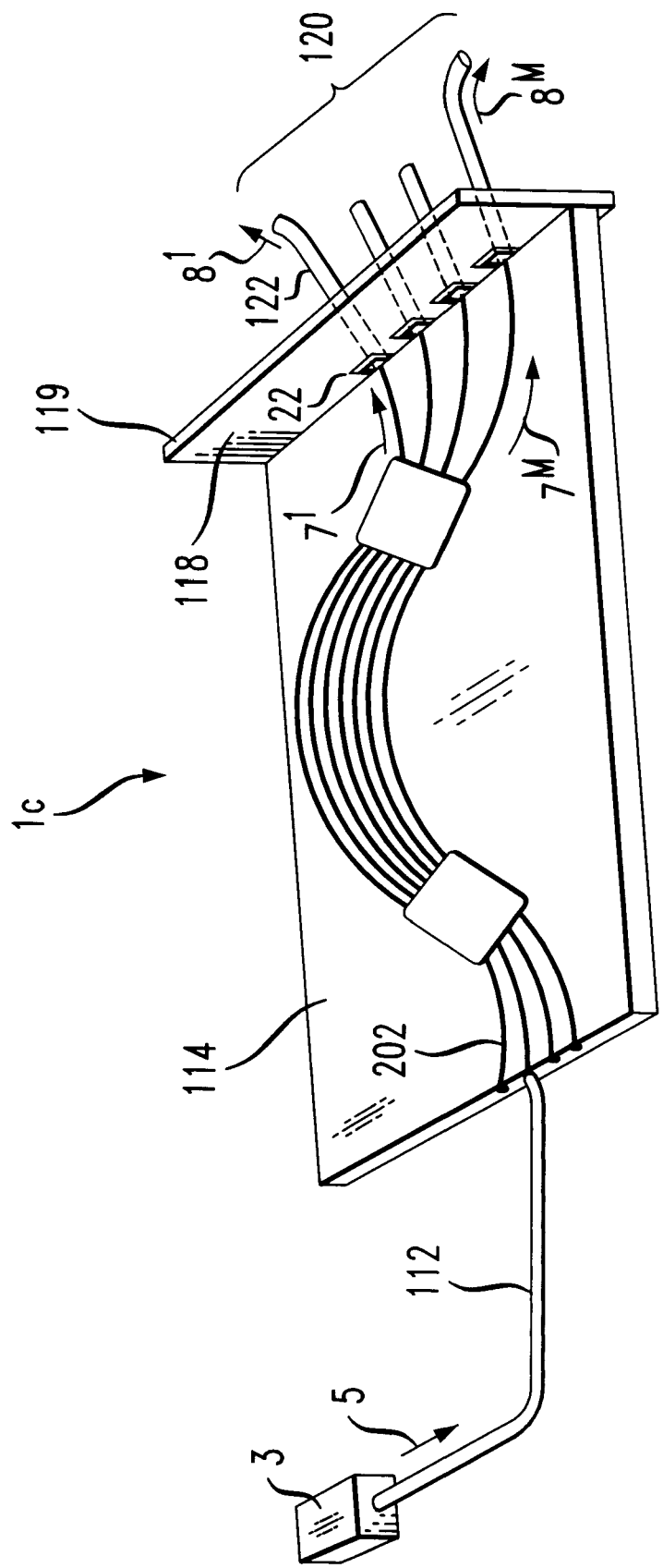
FIG. 5 is a schematic view of a third illustrative embodiment of a single-source WDM transmitter according to the present invention.

A first alternative embodiment of a transmitter 1c using transmissive modulators is shown in FIG. 5. The transmitter 1c is formed by replacing the array 116 of reflective modulators 21 shown in FIG. 3 with an array 118 of transmissive modulators 22 and coupling an output fiber 122 from an array 120 of such output fibers to each modulator 22. Thus, a different modulated spectral component $8^i$ is carried by each fiber 122 in the array.

Figure 6:
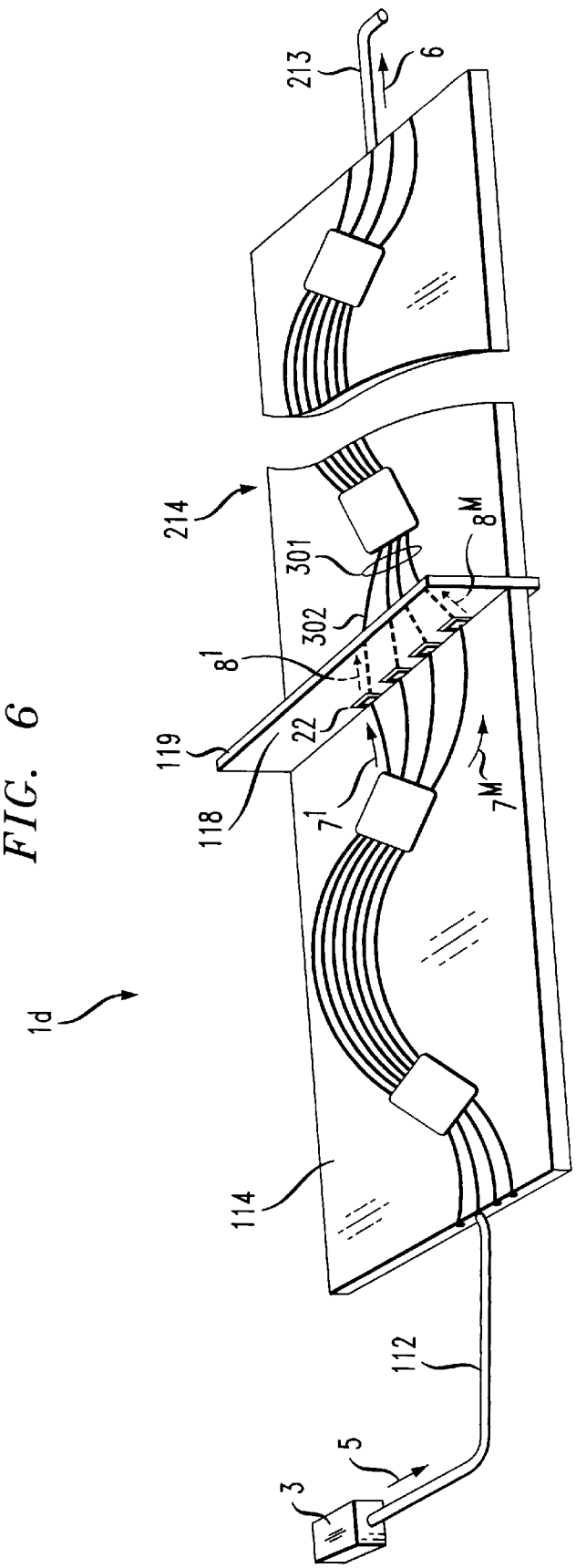
FIG. 6 is a schematic view of a fourth illustrative embodiment of a single-source WDM transmitter according to the present invention.

The transmitter 1c does not multiplex the modulated spectral components $8^{1-M}$. FIG. 6 shows a second alternative embodiment of a transmitter 1d according to the present invention, in which the modulated spectral components are multiplexed onto a single fiber 213. In the illustrative embodiment of a transmitter 1d shown in FIG. 6, a second arrayed waveguide 214 is used for such multiplexing.

As shown in FIG. 6, the spectral components $7^{1-M}$ of an optical signal 5 are spatially separated and delivered to the array 118 of transmissive modulators 22 by the first arrayed waveguide 114. The modulated spectral components $8^{1-M}$ are delivered to an input array 301 of waveguides 302 belonging to the second arrayed waveguide 214. The second arrayed waveguide 214 combines the modulated spectral components into a WDM optical signal 6, which is delivered to the fiber 213.

It will be appreciated that a routing device, such as the routing device 110 appearing in FIG. 3 is not required in the transmitters 1c or 1d.

In both of the transmitters 1c and 1d, the modulators 22 will typically be located on either a first surface of the substrate 119 nearest the arrayed waveguide 114, or on a second surface nearest the output fiber array 122 (transmitter 1c) or the second arrayed waveguide 214 (transmitter 1d). If the modulators are located on the first surface, the waveguides 211 in the output array 212 can be butt coupled to the modulators 22. The thickness of the substrate 119, however, prevents butt coupling the other array of waveguides, i.e., the array 122 for the transmitter 1c or the array 302 of the second arrayed waveguide 214 for the transmitter 1d, to the modulators. Alternatively, if the modulators 22 are located on the second surface of the substrate 119, the waveguides in the array 122 or 302, depending upon the embodiment, can be butt coupled the modulators. In such embodiments, however, the thickness of the substrate 119 will prevent butt coupling the waveguides in the output array 212 of the arrayed waveguide 114 to the modulators. As such, a lenslet array can be used to relay image the optical "spots" to the appropriate destination, i.e., either to the modulators 22 or to the array 122 (transmitter 1c) or the array 302 (transmitter 1d).

The lenslets, which can be fabricated by methods known to those skilled in the art, can be located on the substrate 119 on the surface opposite to the surface on which the modulators 22 reside. Alternatively, the lenslets can be disposed on a separate substrate. In either case, the lenslets are placed between the modulators 22 and which ever array is not butt coupled to such modulators.

As an alternative to using lenslets, fiber alignment/receiving regions, not shown, may be formed in the substrate 119 on the surface opposite to the surface on which the transmissive modulators 22 reside. Such regions function to align each waveguide with a respective transmissive modulator 22 and further facilitate placing each waveguide in close proximity to a modulator 22. The fiber alignment/receiving regions can be formed using a timed crystallographic etch. Such fiber alignment/receiving regions are described in detail in the aforereferenced application Ser. No. 08/775,910 and U.S. Pat. No. 5,815,616.

Figure 7:
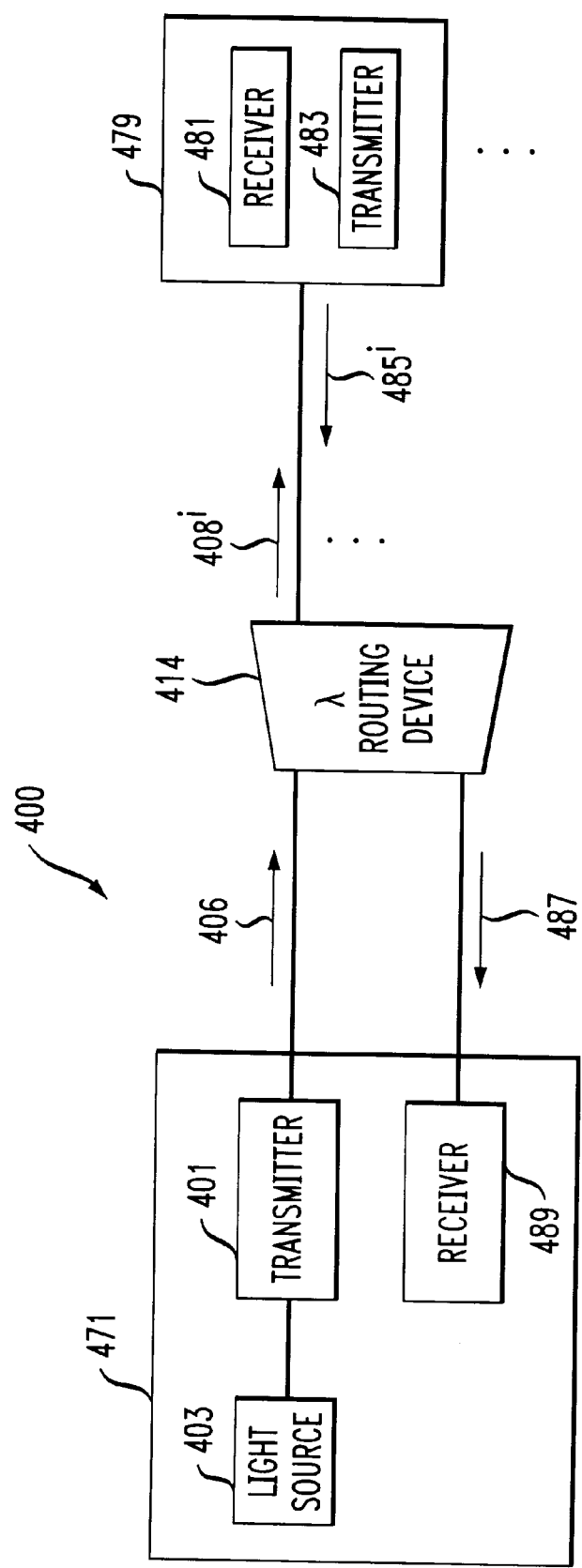
FIG. 7 is an illustrative embodiment of an optical communications network utilizing a WDM transmitter according to the present invention.

Among other applications, a WDM transmitter according to the present invention can be used advantageously in a WDM optical communications network. An exemplary passive optical network using a WDM transmitter according to the present invention is illustrated in FIG. 7.

The network 400 includes a central office or head end terminal 471 having a broad band or multiwavelength optical source 403 and a WDM transmitter 401 according to the present invention, such as the transmitters 1a–1d. The WDM transmitter 401, in conjunction with the optical source 403, is operable to provide one or more information-encoded multiplexed optical signals 406 or (information-encoded demultiplexed optical signals). The one or more optical signals 406 are distributed to a plurality of optical network units (ONUs) 479. Each ONU 479 receives information intended for it on a prescribed wavelength. A wavelength routing device 414, such as a Dragone router, demultiplexes the optical signal 406 into its spectral components $408^{1-M}$, and routes each of such spectral components to the appropriate ONU 479, i.e., the spectral component having a wavelength matching the prescribed wavelength of the ONU is routed thereto.

Each ONU 479 may include a receiver 481, such as a photodetector, and a transmitter 483, such as a modulator. A first portion of the optical energy of the spectral component received by the ONU 479 is routed to the receiver 481, which converts the received portion to an electrical signal. The electrical signal is then routed to processing electronics, not shown, for decoding of information content contained therein.

A second portion of the optical energy of the spectral component is routed to the transmitter 483. The transmitter is operable to encode information onto the second portion, returning information-carrying spectral component $485^i$.

The receiver 481 and transmitter 482 in each ONU 479 can be configured and packaged in a variety of ways, such as those disclosed in U.S. Pat. Nos. 5,767,997; 5,784,187 and 5,815,616; and patent application Ser. No. 08/970,690 filed Nov. 14, 1997; patent application Ser. No. 08/712,530 filed Sep. 11, 1996 now U.S. Pat. No. 5,857,048, and patent application Ser. No. 08/775,910 filed Jan. 2, 1997.

The information-carrying spectral components $485^i$ are delivered to the wavelength routing device 414, which, operating in reverse, multiplexes information-carrying spectral components 485 received from the ONUs 479 into a multiplexed optical signal 487, which is routed to a receiver 489 in the central office 471.

Although several specific embodiments of this invention have been shown and described herein, it is to be understood that such embodiments are merely illustrative of the many possible specific arrangements that can be devised in application of the principles of this invention. Numerous and varied other arrangements can be devised in accordance with these principles by those of ordinary skill in the art without departing from the scope and spirit of the invention.

We claim:

1. A transmitter suitable for providing a wavelength division multiplexed (WDM) information-encoded optical signal from a single broad wavelength bandwidth or multi-wavelength optical source capable of generating an optical signal having a plurality of spectral components, comprising:

at least one input fiber optically coupled to the optical source for receiving a first optical signal therefrom, the first optical signal having a plurality of spectral components;

a device operable to spatially separate each spectral component of an optical signal, wherein the device is optically coupled to the input fiber so as to receive the first optical signal and spatially separate each of its spectral components, and further wherein the device is operable to combine spatially separated spectral components it receives into a WDM signal; and an array of modulators, each of which modulators is operable to encode information onto a spectral component, wherein each modulator of the array receives a different one of the spatially separated spectral components; wherein, the modulated spectral components are delivered to one of either the device or a second device by which the modulated spectral components are combined into a WDM information-encoded optical signal.

2. The transmitter of claim 1 wherein the device operable to spatially separate each spectral component is optically coupled to the input fiber via free space optics.

3. The transmitter of claim 2 wherein the device operable to spatially separate each spectral component is a diffraction grating.

4. The transmitter of claim 3 wherein the diffraction grating is oriented in a skew-Littrow configuration.

5. The transmitter of claim 3 further comprising a collimating device optically coupled to the at least one input fiber, the collimating device operable to focus all the spectral components of the first optical signal at substantially infinite conjugates.

6. The transmitter of claim 5 further comprising a focusing/collimating device that receives the spatially-separated spectral components from the diffraction grating and delivers a different one of the spatially-separated spectral components to each modulator in the array.

7. The transmitter of claim 6 wherein the focusing/collimating device is spatially oriented so that spatially-separated spectral components are received along a first path that is off center with respect to the optical axis of the focusing/collimating device.

8. The transmitter of claim 7 wherein the modulators operate in a reflective mode wherein the modulated spatially-separated spectral components are directed towards and received by the focusing/collimating device, which collimates and directs them to the diffraction grating for multiplexing into a co-propagating modulated WDM optical signal.

9. The transmitter of claim 8 further comprising a focusing lens that receives the modulated WDM signal from the diffraction grating and focuses all the spectral components of the modulated WDM signal onto at least one output fiber so that the modulated WDM signal is coupled to the at least one output fiber.

10. The transmitter of claim 1 wherein the at least one input fiber is one of a plurality of input fibers comprising a 1-D array of input fibers.

11. The transmitter of claim 10 wherein the modulator array is a 2-D array arranged into rows and columns for receiving and modulating the spectral components from the first and a second optical signal.

12. The transmitter of claim 1 wherein the device operable to spatially separate each spectral component is optically coupled to the input fiber via integrated optics.

13. The transmitter of claim 12 wherein the device operable to spatially separate each spectral component is a first arrayed waveguide.

14. The transmitter of claim 13 wherein the arrayed waveguide comprises:
an input array and an output array of waveguides;
a first planar free space region connected to the input array of waveguides;
a second planar free space region connected to the output array of waveguides; and
a waveguide grating connecting the first and the second planar free space region, the waveguide grating consisting of a plurality of unequal length waveguides having a constant path length difference between adjacent waveguides, wherein,
the at least one input fiber is connected to one of the waveguides in the input array.

15. The transmitter of claim 14 further comprising a routing device, wherein the routing device receives the first optical signal and routes it to the at least one input fiber, and further wherein the routing device receives the information-encoded WDM signal and routes it to at least one output fiber.

16. The transmitter of claim 13 wherein each modulator of the array is a transmissive modulator, the transmitter further comprising a second arrayed waveguide, wherein each waveguide in an input array of such waveguides is optically coupled to a different transmissive modulator in the modulator array, wherein the second arrayed waveguide is operable to multiplex the modulated spectral components into an information-encoded WDM signal.

17. The transmitter of claim 1 further comprising the single optical source.

18. An optical communications network comprising:
a WDM transmitter located at a head terminal for launching a multiplexed optical signal encoded with a first group of information into an optical medium, the WDM transmitter comprising:
at least one input fiber for receiving an optical signal from a broad wavelength bandwidth optical source optically coupled thereto, the optical signal having a plurality of spectral components corresponding to a different wavelength;
a device optically coupled to the input fiber and operable to spatially separate each spectral component of the optical signal, and further operable to combine spectral components received thereby into a multiplexed optical signal; and an array of modulators, each of which modulators is operable to encode a part of the first group of information onto a spectral component, wherein each modulator of the array receives a different one of the spatially separated spectral components;
a wavelength routing device for receiving the multiplexed optical signal from the optical medium, and operable to spatially separate the spectral components each encoded with a part of the first group of information, and further operable to route each of the spectral components to a different optical network unit, which different units receive a spectral component having a prescribed wavelength; and
a plurality of the optical network units, each of which units are operable to encode a part of a second group of information onto a portion of the received spectral component; and
a receiver located in the head end terminal for receiving the parts of the second group of information encoded on the spectral components at the optical network units.

19. The network of claim 18, wherein each optical network unit comprises:
a detector that receives a first portion of optical energy of the spectral component received by the optical network unit, wherein the detector is operable to convert the received first portion of optical energy to an electrical signal; and
a modulator that receives a second portion of the optical energy of the spectral component, wherein the modulator is operable to encode a part of the second group of information onto the second portion; wherein,
the encoded spectral components from each optical network unit are multiplexed and delivered to the receiver.

20. A method for generating a wavelength division multiplexed optical signal from a single optical source, comprising the steps of:
delivering an optical signal from a single broad wavelength bandwidth or multiwavelength optical source to a device for spatially separating spectral components of the optical signal via a plurality of input fibers that are optically coupled to a first lens which is in turn optically coupled to said device for spatially separating the spectral components;
spatially separating the spectral components of the optical signal using the device;
directing the spatially separated spectral components to an array of modulators, wherein each spectral component is delivered to a different modulator in the array;
modulating the spectral components received by the modulators; and
combining the modulated spectral components into a wavelength division multiplexed optical signal.

21. The method of claim 20 wherein the step of directing the spatially separated spectral components to an array of modulators further comprising the step of providing a second lens for receiving the spatially-separated spectral components and delivering a different one of the spatially-separated spectral components to each modulator in the array, wherein the second lens is spatially oriented so that spatially-separated spectral components are received along a first path that is off center with respect to an optical axis of the focusing device.

* * * * *